Nov. 13, 1962     T. F. SMITH     3,063,334
PANORAMIC PROJECTION SYSTEM
Filed March 25, 1958     2 Sheets-Sheet 1
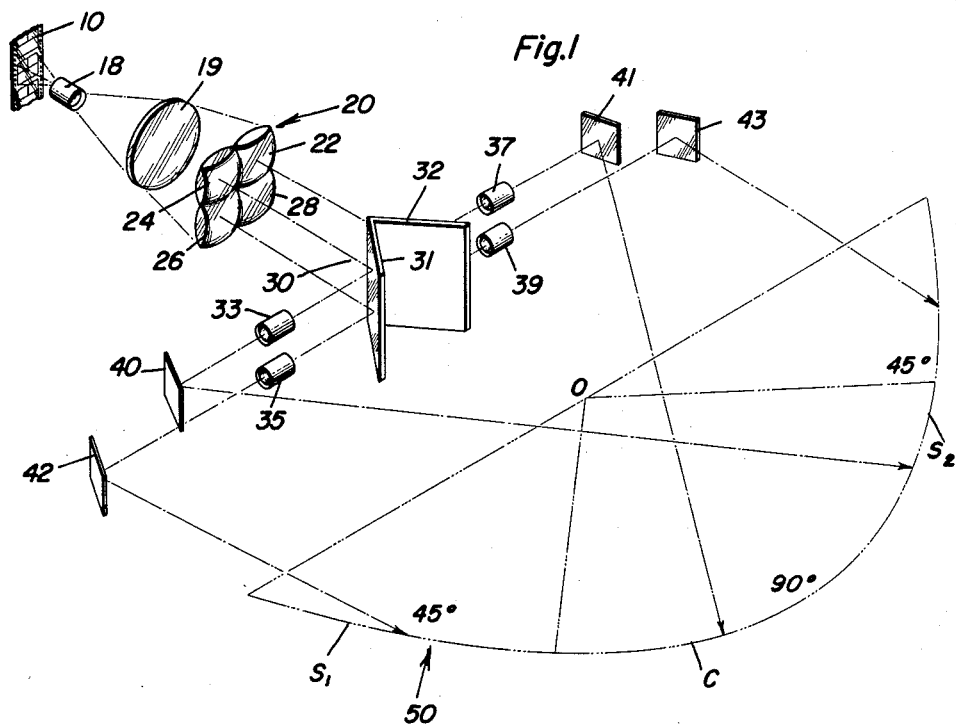
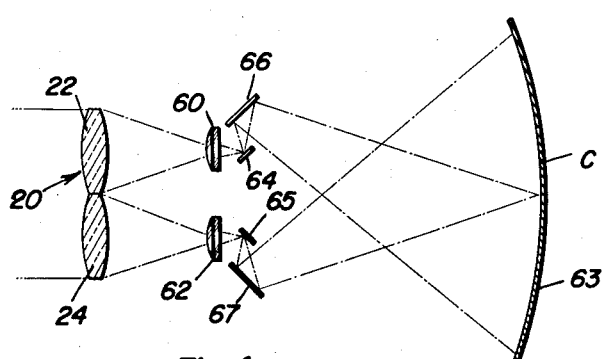
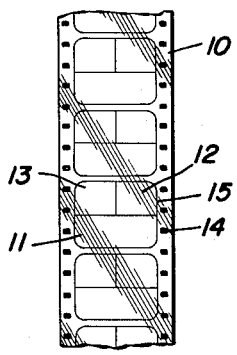
Tom F. Smith
INVENTOR.

Nov. 13, 1962 T. F. SMITH 3,063,334
PANORAMIC PROJECTION SYSTEM
Filed March 25, 1958 2 Sheets-Sheet 2
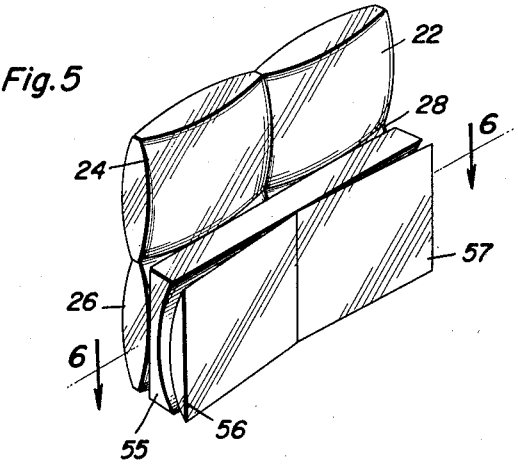
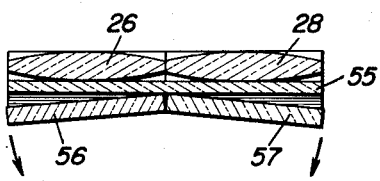
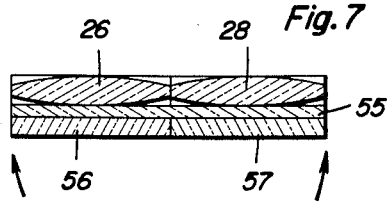
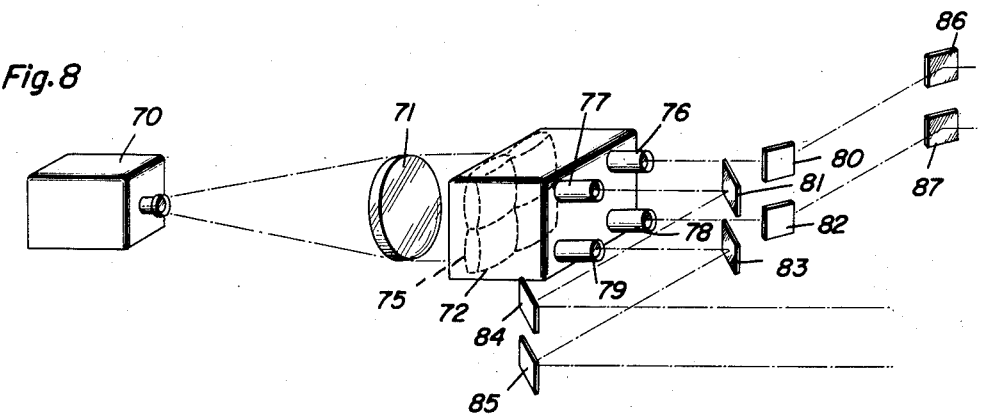
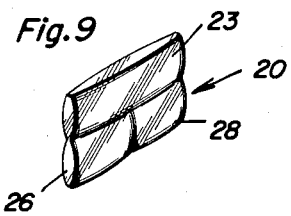
Tom F. Smith
INVENTOR.
BY *Lawrence A. O'Brien*
*and Harvey B. Jacobson*
Attorneys

United States Patent Office 3,063,334
Patented Nov. 13, 1962

3,063,334
PANORAMIC PROJECTION SYSTEM
Tom F. Smith, Urbana, Mo., assignor of fifty percent to Rowe E. Carney, Jr., Rolla, Mo.
Filed Mar. 25, 1958, Ser. No. 723,767
2 Claims. (Cl. 88—16.6)

This invention relates to a projection system and more specifically to a panoramic or wide angle projection system using a curved screen extending over an arc which exceeds 120° and which is approximately 180° or which, in some cases, even exceeds this value.

Systems of this kind produce projection pictures giving an impression of reality which is by far superior to that obtainable with flat screens or with curved screens covering a smaller angle. Such systems have, however, the disadvantage that they require a complex camera and projector assembly. Either three or more picture series must be made by a corresponding number of synchronized cameras and the pictures must be projected on the screen by a like number of synchronized projectors or a single highly complex camera and projector must be used. As all the motion picture theaters are fitted for standard projectors and operate with definite film sizes this excludes the projection of panoramic pictures of the type mentioned in most theaters in which the introduction of highly expensive special projection systems requiring a change of the entire equipment and also a different distribution of audience, projector and screen in space meets with unsurmountable economic and technical difficulties.

Systems have therefore been proposed which permit the use of standard projectors for wide angle projection. In the following specification and claims the expression "standard projector" refers to the conventional projector for the usual types of standard films.

None of these proposed systems has, however, actually been introduced into practice. Most of these systems try to obtain a panoramic picture by means of picture compression and expansion using anamorphotic lens systems.

However, while anamorphotic lenses produce excellent results within limits, it has not been possible to obtain satisfactory results in connection with the expansion of the pictures of a standard size film frame to cover an angle which may be approximately 180°.

Likewise the application of other methods, especially those used in connection with printers, such as the ticker tape projectors which produce composite or sectional wide angle pictures on a flat screen also have failed when applied to curved wide angle projector screens under much more rigorous conditions with respect to the joining and the uniform illumination of the sectional pictures.

This invention is essentially based on a method of taking pictures and of producing films of the type which is described in my earlier co-pending application, Serial No. 672,983, filed July 19, 1957. In this earlier application a method of taking panoramic pictures is described according to which sectional pictures of a panoramic scene covering an angle of around 180° are taken, each sectional picture covering only a certain fraction of this angle and being photographed on a sectional area of the exposed frame, obtained by subdividing the frame longitudinally and transversely in as many areas as there are sectional pictures. According to the present invention a panoramic projection picture covering a curved panoramic wide angle screen is produced by using a film of the type above described, each frame of which is subdivided into sectional areas with each sectional area containing only the photographic picture of a section of the scene covering a fraction of the angle covered by the total scene photographed. The panoramic projection system of this invention consists in projecting the successively projected film frames each containing all the sections of the photographed scene by means of a standard projector with a primary projection lens of the conventional type onto an auxilliary beam distributor device, consisting of a sectionalized screen lens assembly with a number of sectional lenses, each collecting rays from the beam which has passed one of the sectional film areas. The screen lens assembly separates these beams and passes these separate beams to secondary projector lenses which cooperate with reflecting mean, throwing them on the screen. Each of the secondary projector lenses produces however only a sectional projection picture covering only a fraction of the total angle of the screen, said sectional projection pictures being placed on the panoramic screen in such position that they join in the proper order the sectional projection pictures projected by the other secondary projection lenses and the total panoramic picture being thus built up from sectional pictures each covering a fraction of the total angle only, while the total projection picture covers the full angle thus reproducing the total, photographed panoramic scene.

The invention thus has for its primary object to provide a projection method using a standard projector and a beam distributing device according to which the projection beam issuing from the projector is divided into sections, each section being produced by a separate photographed section of the scene which occupies a sectional area of a frame on the film, all sectional areas of the film on a frame being however projected simultaneously and being aligned on the screen by a distributing device which collects the rays from each sectional picture and directs them into a secondary projection lens which produces the projection of the sectional area of the frame on the screen at a predetermined place towards which the rays are directed by means of suitable reflecting means.

Another object of the invention is a projection system by means of which the sectional pictures of the scene produced on a film by means of a camera described in my co-pending earlier application are aligned on the screen after they have been separated so that they form together a unitary picture extending over an arc of at least 120° and preferably over an arc of 180° and even beyond 180°.

A further main object of the invention therefore consists in providing the additional auxiliary equipment, preferably in the form of an attachment to the standard projector, which collects and separates the beam sections passing through the sectional areas of the frames and passing the beam sections on to the secondary projector lenses, producing separate projection pictures which are then aligned on the screen.

A further object of the invention consists in interposing between the primary projection lens and the secondary projection lenses, each of which produces only a partial projection picture corresponding to one of the pictures photographed on one sectional area of the frame, a screen lens assembly, directing that portion of the beam which issued from the primary projector lens, after having passed through one of the sectional areas of the frame, toward one of the secondary projection lenses.

A further object of the invention consists in providing means subdividing a picture section which is a unit when leaving the primary projector lens, into a plurality of sections, the rays of which are directed toward a plurality of secondary projection lenses, this object being attained by means of closely fitting screen lens sections directing rays of the unitary beam which have passed through a single sectional area of the frame into different directions.

A further object of the invention consists in providing reflecting elements cooperating with the secondary projection lenses which direct the rays laterally towards a point from which by means of further reflecting elements they can be thrown on the screen at the desired location.

A further object of the invention consists in providing reflecting elements arranged in pairs, each pair being associated with one of the secondary projection lenses, one reflecting element of the pair being inserted between the screen lens assembly and a secondary projection lens and the other element of the pair being arranged between the last named lens and the screen, the secondary projection lens, while optically aligned with one of the sectional lenses of the screen lens assembly being arranged in the portion of the beam which was deflected and laterally directed.

A further object of the invention consists in providing an arrangement of the secondary projection lenses in which these lenses are directly facing the sectional lenses of the screen lens assembly.

A further object of the invention consists in providing between the primary projection lens and the sectional screen lens assembly a collecting collimator lens for collecting the divergent rays from the primary projection lens and directing them as a parallel beam of rays towards the sectional screen lens assembly.

A further object of the invention consists in providing means for correcting the keystone effect which is due to the fact that the projector is not located in the center of curvature of the screen, said means being preferably adjustable in order to compensate for different distances of the projector from the center of curvature.

Further objects of the invention will be apparent from the following detailed specification.

The invention is illustrated in the accompanying drawings showing several modifications thereof diagrammatically. It is however to be understood that the diagrammatic illustration intends merely to explain the principle of the invention and the best mode of applying said principle. The diagrammatic illustrations do not contain actual constructive details and any modification or change in the details which may appear in the diagrammatic sketches are not to be rated as essential as will readily be understood by experts skilled in the art, and a departure therefrom is not necessarily a departure from the essence of the invention.

In the drawings:

FIGURE 1 is a perspective diagram illustrating the projection system according to the invention;

FIGURE 2 is a diagrammatic illustration of the film used in order to produce a panoramic wide angle picture;

FIGURE 3 is a sectional plan view of the sectional lenses of a screen lens assembly;

FIGURE 4 is a diagrammatic view of the central portion of a panoramic screen and of the means for projecting sectional projection pictures on the central part of the screen;

FIGURE 5 is a perspective diagrammatic illustration of the means for correcting a keystone effect;

FIGURES 6 and 7 are horizontal sections through the screen lens arrangement and corrective arrangement shown in FIGURE 5 the sections being taken along the line 6—6 of FIGURE 5, FIGURE 6 showing the adjustment of the cylindrical lenses for a certain type of correction, while FIGURE 7 shows the position of the cylindrical lenses when no adjustment is required;

FIGURE 8 diagrammatically shows a modification of the system as illustrated in FIGURE 1 with secondary projection lenses in front of and aligned with the sectional lenses of the screen lens assembly; and FIGURE 9 is a perspective view of a modification of the screen lens assembly.

The general principle on which the invention is based has already been explained. Essentially it consists in projecting simultaneously a plurality of separate sectional pictures of a scene, each sectional picture covering a fraction of the total angle of the scene viewed, and in inserting into the projection beam a lens assembly, hereinafter called "screen lens assembly," which receives and collects the rays passing through each of the sectional pictures separately and directs them towards secondary projection lenses which lenses therefore only project sectional pictures. Reflecting means direct the projection beams from each of the secondary projection lenses towards the screen and place them in such location that the sectional projection pictures join to form a unitary projection picture reproducing the scene.

As will be seen in FIGURE 1 a film 10 may be used which corresponds to one of the films which may be produced by means of the camera arrangement described in my earlier application, Serial No. 672,983, now abandoned. By means of such a camera each frame of the film is subdivided into a number of sectional frames or areas. Preferably as shown in FIGURE 2, the frame is divided into three sectional frames 11, 12 and 13 of which the section 11 is twice as wide as the sections 12 and 13 of the frame 15. If a scene covering an angle of 180° has been photographed the central part of the scene covers an angle of 90° which is photographically reproduced in section 11 of the film frame. In addition there are two side sections, each covering an angle of 45° which are represented by the frame sections 12 and 13 of the frame 15.

In my said earlier application it is explained how such a film is produced, and how the lateral sections 12, 13 of the frames are placed on the film in proximity to the wider section 11 in the manner shown in FIGURE 2.

The film is inserted into a conventional projector termed "standard projector," not shown in FIGURE 1, which is diagrammatically indicated by the standard projection lens 18 hereinafter called the "primary projection lens." This primary projection lens 18 throws its divergent rays on a collimator lens 19 which directs them in a parallel bundle of rays towards the screen lens assembly 20.

The screen lens assembly 20 consists of either three or four sectional elements, the former modification being illustrated in FIGURE 9, while FIGURE 1 illustrates the division into four elements. The division of the screen lens assembly 20 into sectional lenses follows in most cases closely the division of the frame 15 into sectional frames, but, as illustrated in FIGURE 1, the screen lens assembly 20 may be used to produce a subdivision of a sectional beam. The beam thrown through the sectional frame 11 covering the full width of the film may be projected onto two closely fitted lens sections 22, 24 of the screen lens assembly. This modification, illustrated in FIGURE 1, is preferable on account of the short focal length of the lenses 22, 24 which is necessary and which requires special lenses to cover a beam, extending through the full width of the film and it is therefore convenient to replace a single section of the lens assembly 23, such as illustrated in FIGURE 9, by two sections 22, 24. This can be done by using very closely and accurately fitted lenses, such as shown in cross section in FIGURE 3. If tightly and exactly fitted there is no loss of field and in fact no seam is observable when the two screen lenses 22, 24 cooperate to produce on the screen a single continuous projection picture without loss.

In the system illustrated in FIGURE 1 but with the film 10 in a vertical position in the projector, as shown, the frame section 11 which encompasses an angle of 90° of the scene photographed is the lower section of the frame. Therefore the projection lens 18 throws the beam passing through this section upon the sections 22 and 24 of the screen lens 20 which form the upper half of screen lens assembly 20. The two sections 26 and 28 receive the beams passing through the frame sections 12 and 13 and form the lower half. They direct the rays towards the reflector element 30 which consists of the two reflector plates 31, 32 arranged at an angle of 90° towards each other and of 45° towards the optical axes of the lenses of the screen lens assembly 20.

The rays from each lens section 24, 22; 26, 28 are focused by secondary projection lenses 33, 37 and 35, 39, respectively. These secondary projection lenses produce the projection pictures which are projected on the screen by means of additional reflecting elements 40, 42 on one side and 41, 43 on the other side of the reflecting element 30, respectively.

The screen is diagrammatically indicated in FIGURE 1 at 50 by a line indicating a horizontal section through the center of the screen. The screen in this case consists of three sections $S_1$, C, and $S_2$. Each section receives the projection picture produced by means of one sectional frame of the film 10. The sections $S_1$, $S_2$ receive the projection pictures produced by a beam portion passing through sections 12, 13 of the frame and the section C of the film receives the projection picture produced by a beam portion passing through section 11 of the frame. This sectional beam is split into two sub-sectional beams which produce projection pictures joining on the screen, the lens section 24 projecting one subsection of the beam on the screen, while the lens section 22 projects the other subsection of the beam on the screen, as will be seen by the lines in dots and dashes indicating the central rays of the beams.

The entire arrangement, consisting of the lens 19 of the screen lens assembly 20, the reflector 30, the secondary projection lenses 33, 35; 37, 39 and the reflectors 40, 41; 42, 43 may form a single auxiliary assembly which may be placed in front of the standard projector with projection lens 18 as an attachment or unit. To produce a wide angle picture by means of a conventional standard projector it is thus only necessary according to the invention to use the new type of film and to add the auxiliary equipment described, while the standard projection equipment in other respects remains unchanged.

The arrangement has the further advantage that the projector booth with the standard projector need not be moved to be close to the center of curvature of the screen. It may be located at a larger distance from the center of curvature O of the screen than would otherwise be admissible. The pictures are projected on the screen by means of the secondary projection lenses which as seen are at a distance from the primary projection lens and in fact for panoramic pictures of the type described the projection lenses should be located as closely as possible to the point O forming the center of curvature of the screen, as otherwise considerable distortion may be experienced.

A marked "keystone" effect, that is a distortion changing angular relationships and occurring mainly in the lateral sections of the screen, will occur whenever it is not possible to place the projection lenses into the center of curvature O of the screen.

Although the secondary projection lenses are nearer to the center of curvature than the primary projection lens 18 it is as a rule not feasible to place them near enough to the center of curvature to avoid a keystone effect completely. In most cases therefore the keystone effect is sufficiently marked to require correction. Such correction is provided by means of a cylindrical lens system placed in front of the sectional lens elements 26, 28 through which the lateral sections of the pictures are projected.

The cylindrical lens system includes a plano-concave cylindrical lens 55 which may be of sufficient width to cover the full width of the screen lens assembly 20. A single cylindrical lens may thus be arranged in front of both lens elements 26, 28. This plano-concave element 55 cooperates with plano-convex elements 56, 57 each of which covers one-half of the full width of the screen lens assembly 20. Therefore each of the plano-convex elements 56, 57 is located in front of one of the sectional lenses 26, 28 of the assembly 20. Said two cylindrical lens elements 56, 57 and 55 have the same radius of curvature although the curvature is positive in one lens and negative in the other lenses. Therefore, if pressed against each other so that the convex and concave sides of the lenses engage, the two planar sides of the lens system are parallel as shown in FIGURE 7 and the entire cylindrical lens system has zero power. However, if the two lenses 56, 57 are angularly displaced with the inner end portions of the lenses 56, 57 remaining stationary while the outer edges of the lenses 56, 57 are moved outwardly as suggested by the arrows in FIGURE 6 so as to be at a distance from the lens 55, the system will produce a distortion which is proportional to the angular displacement of the lenses 56, 57 and which distortion must be so selected that it compensates exactly the distortion due to keystone effect and restores the correct original shape of the projection picture.

The lenses 55, 56, and 57 may be held in a frame (not shown) in which they can be locked in their correct positions. An adjustment is only necessary upon a change of the relative position of the screen, projector and lens system, so that the adjustment in fact need only be made once. The adjustment need only be repeated when a complete rearrangement of the theatre occurs or when the equipment is moved to another place.

Instead of using the arrangement of parts shown in FIGURE 1 in which a double reflector is placed in front of the screen lens system, a secondary projection lens system 60, 62 may be used, preferably with lenses of a very short focus, which may be placed directly in front of the screen lens system, as shown in FIGURE 4. This is especially of advantage in connection with sectional lenses 22, 24 which direct the rays producing the picture to be projected on the central sector C indicated at 63 in FIGURE 4. Mirrors 64, 65 may be placed in the focus of the secondary projection lenses 60, 62 which mirrors reflect the rays toward a second set of mirrors 66, 67 respectively, thus producing the two halves of the projection picture projected on the central sector 63 of the screen by the projection lenses 60, 62. While this method is especially suitable for the central section of the picture it may also be used to produce sectional projection pictures on the lateral sections.

The method as illustrated in FIGURE 1 is of course also usable if a screen lens assembly with a single upper screen lens section 23 is used instead of the dual sectional lenses 22, 24 in order to project the central sector of the panoramic picture. In this case the screen lens arrangement is provided with a sectional lens 23 extending over the entire width of the screen lens 20 as shown in FIGURE 9. This wider lens cooperates with a single secondary projection lens and with the two sectional lenses 26, 28 through which the beam passes which is projected on the lateral sections of the screen in the manner already described.

A similar arrangement in which the secondary projection lenses for all the sections of the screen are directly arranged in front of the screen lens is illustrated in FIGURE 8. This figure shows a standard projector 70 with a projection lens throwing the beam onto the collimator lens 71 which transforms the divergent bundle of rays into a bundle of parallel rays. The lens 71 is shown as a separate element, but in actual construction it is preferably so constructed that it may be held by or joined to the box 72 which contains the auxiliary lens assembly. One of the members of this auxiliary assembly is the screen lens assembly 75 which consists of the four sections described in connection with FIGURE 1. Aligned with the optical axes of the sectional lenses of the screen lens assembly 75 are the secondary projector lenses 76, 77, 78, 79 which focus the image produced by the sectional lenses and throw them onto the screen (not shown in FIGURE 8). To direct the sectional beam of each secondary projection lens to that part of the screen which receives the projection picture of this secondary projection lens, pairs of mirrors 80, 86; 81, 84; 82, 87; and 83, 85 are arranged which direct the sectional projection picture beams toward the screen sections onto which they are placed. The two secondary projection lenses 76 and 77 may cooperate in the manner shown in FIGURE 4 so that the two projection lenses together produce the projection picture in the central portion of the screen. The two secondary objectives 78 and 79 by means of the mirrors 82 and 87, 83 and 85, respectively, then direct the projection pictures toward the lateral sections of the screen on both sides of the central section.

Also in this case it is possible to use a single screen lens section (such as section 23 in FIGURE 9) cooperating with a single secondary projection lens for projecting the central picture on the central section of the screen. In such a case only three secondary projection lenses are necessary. However, as it is difficult to produce lenses having the same focal distances for the three sectional lenses, the field covered by the lenses being of rather widely different widths, it is preferable to use the arrangement shown in FIGURE 1. Different focal distances in the lenses would entail a different perspective in the picture which would be noticeable.

Whenever special lenses of short focal distance covering a very wide angle are to be avoided, the field is preferably divided into equal sections, each sectional beam passing through a lens of the same width and the sectional lenses preferably cooperate with secondary projector lenses having all the same character.

The projection system, as described, thus produces projection pictures which cover practically any arc up to 180° and larger areas and, if suitably fitted and adjusted, the system produces a panoramic picture consisting of accurately fitting sections in which no difference of illumination or perspective can be detected. The system contains the necessary means for correcting any distortion of the lateral picture sections which may be due to the eccentric position of the projector relative to the center of curvature of the screen, but it also reduces this distance, as the secondary projection lenses, which produce the projection picture on the screen, may be placed nearer to the center of curvature than the projector itself.

It will be clear that many changes may be made without in any way departing from the essence of the invention, as will be obvious to the expert skilled in the art. Further non-essential changes in the system may be made without changing the essence of the invention as defined in the annexed claims.

Having described the invention what is claimed is:

1. In a system for projecting panoramic scenes comprising a projector, said projector adapted to project through a first projection lens a panoramic scene from a film each frame being longitudinally and transversely subdivided into four substantially equal areas, each sectional area carrying a picture of a scene photographed which corresponds to a definite angular section of the scene, a collimating lens positioned to receive a projected beam consisting of each of the sectional areas of a single frame from the projection lens, a screen lens assembly positioned to receive the projected beam after it passes through the collimating lens, said screen lens assembly consisting of four separate convex lenses positioned along a transverse plane with respect to said projected beam in optical alignment therewith, two in one row and two in a row directly below, each of the four lenses being adapted to receive a different portion of the said projected beam corresponding to the sectional area of the film frame, four secondary projection lenses positioned along a transverse plane with respect to said projected beam in optical alignment therewith, two in one row and two in a row directly below, each of the four secondary projection lenses being adapted to receive a different portion of the said projected beam corresponding to the sectional area of the film frame, separate first reflectors positioned to receive a different portion of the said projected beam from each of the secondary projection lenses, the said reflectors being two in one row and two in a row directly below, the said reflectors in one vertical plane being adapted to reflect the different portions of the beam laterally in one direction, the said reflectors in another vertical plane being adapted to reflect the different portions of the beam laterally in another direction, separate second reflectors adapted to receive the separate beams from the separate first reflectors and to reflect the separate beams in a direction and in a manner whereby the beams are distributed horizontally over an arcuate screen.

2. In a system for projecting panoramic scenes over an arcuate screen from separate beams comprising a projector, said projector adapted to project through a first projection lens a panoramic scene from a film each frame being longitudinally and transversely subdivided into four substantially equal areas, each sectional area carrying a picture of a scene photographed which corresponds to a definite angular section of the scene, a collimating lens positioned to receive a projected beam consisting of each of the sectional areas of a single frame from the projection lens, a screen lens assembly positioned to receive the projected beam after it passes through the collimating lens, said screen lens assembly consisting of four separate convex lenses positioned along a transverse plane with respect to said projected beam in optical alignment therewith, two in one row and two in a row directly below, each of the four lenses being adapted to receive a different portion of the said projected beam corresponding to the sectional area of the film frame, four secondary projection lenses positioned along a transverse plane with respect to said projected beam in optical alignment therewith, two in one row and two in a row directly below, each of the four secondary projection lenses being adapted to receive a different portion of the said projected beam corresponding to the sectional area of the film frame, plano-convex and plano-concave lenses positioned to receive the beams projected by two of the secondary projection lenses and being those beams projected on the outermost portion of said arcuate screen, said lenses having the same curvature radius so as to fit into each other, the lenses being relatively movable to produce a distortion correcting a keystone effect, separate first reflectors positioned to receive a different portion of the said projected beam from each of the secondary projection lenses, the said reflectors being two in one row and two in a row directly below, the said reflectors in one vertical plane being adapted to reflect the different portions of the beam laterally in one direction, the said reflectors in another vertical plane being adapted to reflect the different portions of the beam laterally in another direction, separate second reflectors adapted to receive the separate beams from the separate first reflectors and to reflect the separate beams in a direction and in a manner whereby the beams are distributed horizontally over the arcuate screen.

References Cited in the file of this patent

UNITED STATES PATENTS

| | | |
|---|---|---|
| 1,136,236 | Killman | Apr. 20, 1915 |
| 1,696,431 | Crockett | Dec. 25, 1928 |
| 1,906,215 | Nicholson | Apr. 25, 1933 |
| 1,964,968 | Warmisham | July 3, 1934 |
| 2,142,183 | De Ybarrondo | Jan. 3, 1939 |
| 2,150,165 | Holman | Mar. 14, 1939 |

FOREIGN PATENTS

| | | |
|---|---|---|
| 23,396 | Great Britain | of 1907 |
| 478,766 | Great Britain | Jan. 25, 1938 |
| 768,243 | Great Britain | Feb. 13, 1957 |
| 450,536 | Italy | July 23, 1949 |
| 504,388 | Italy | Dec. 11, 1954 |
| 558,986 | France | June 6, 1923 |